Nov. 26, 1963
C. R. ADAMS
3,112,140
FLUID BEARINGS
Filed Feb. 26, 1962
2 Sheets-Sheet 1
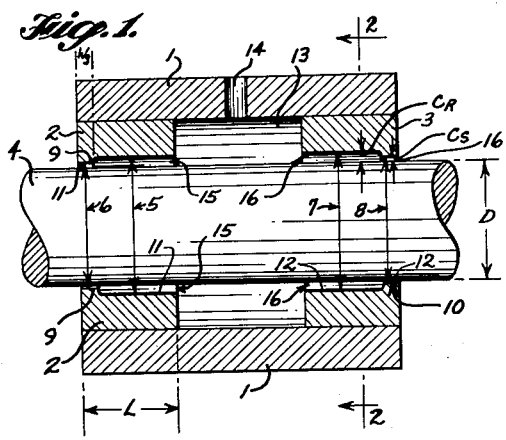
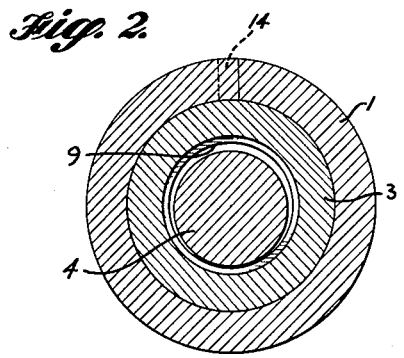
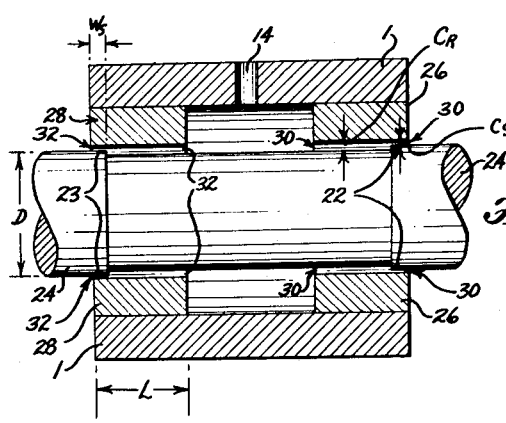
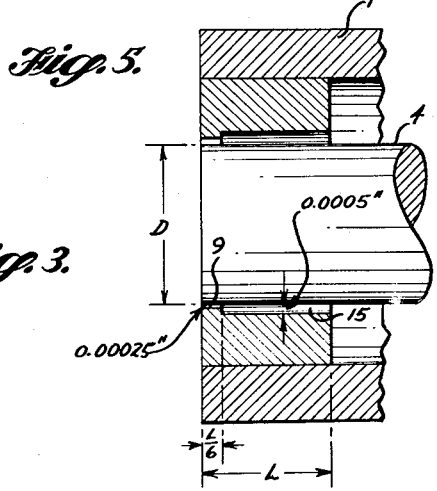
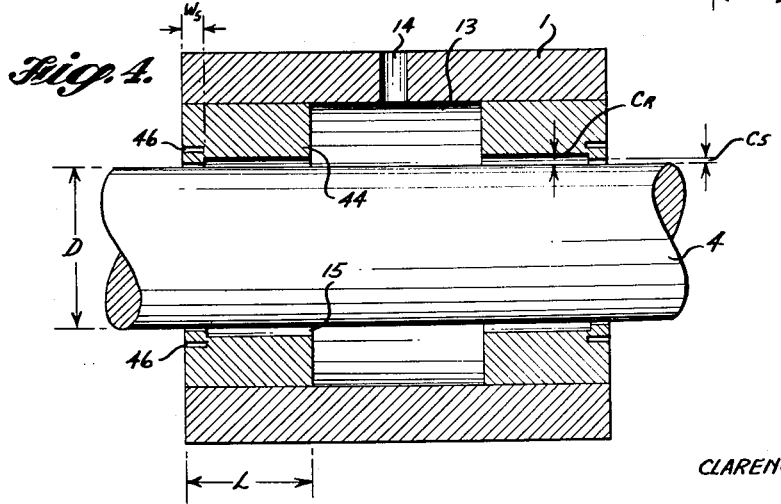
INVENTOR.
CLARENCE R. ADAMS
BY
ATTORNEY 3,112,140
FLUID BEARINGS
Clarence R. Adams, Kirkland, Wash., assignor to The Boeing Company, Seattle, Wash., a corporation of Delaware
Filed Feb. 26, 1962, Ser. No. 175,426
5 Claims. (Cl. 308—122)

This invention relates to bearings and more particularly to fluid supported bearings.

This is a continuation-in-part application of application Serial Number 781,326, filed December 18, 1958, now abandoned, in the name of Clarence R. Adams, and entitled "Fluid Bearing."

Many types of externally pressured radial bearings have heretofore been provided. However, these prior art radial bearings have several limitations. Some of these prior art radial bearings have means to restrict the fluid flow at the bearing surface such as disclosed in the Crooks et al. Patent 2,929,548. However, in the Crooks et al. patent the fluid flow at end of the bearing is from a point external of the bearing through a restricted portion of the fluid passageway to an internal chamber in which there is substantially no pressure drop due to the fluid flow through the chamber. The fluid flow at the other end of the Crooks et al. bearing is through the chamber, where there is substantially no pressure drop due to the fluid flow, and then through another restricted portion of the fluid passageway. Thus, there is only one restricted portion of the fluid passageway at each of the ends of the Crooks et al. bearing for developing a pressure differential capable of supporting radial loads. Therefore, in order for the Crooks et al. bearing to operate the clearance between the shaft and the housing at the restricted portion appearing at each end of such bearing must be 0.003 inch or greater or otherwise there will be insufficient fluid flow at the restricted portion to establish a pressure differential that will support radial loads. In addition, the radial load handling capacity of the Crooks et al. bearing is low as compared to a bearing constructed in accordance with the teachings of this invention and the Crooks et al. bearing requires a larger quantity of fluid flow through the fluid passageway per unit of time to support any radial load and a higher external supply fluid pressure is required to support even low radial loads as compared to a bearing constructed in accordance with the teachings of this invention.

Therefore, an object of this invention is to provide an externally pressurized fluid bearing which has a high radial load handling capacity while a relatively low external supply pressure is maintained on the bearing and while a relatively low quantity of fluid flows per unit of time through the bearing.

Another object of this invention is to provide an externally pressurized fluid bearing which is so constructed as to minimize bearing instability.

A further object of this invention is to provide an externally pressurized fluid bearing which is so constructed that it can satisfactorily operate at high speeds and when exposed to cryogenic temperatures or temperatures approaching the melting point of the bearing material.

Still another object of this invention is to provide an externally pressurized fluid bearing which is so constructed as to provide extremely accurate shaft positioning.

An additional object of this invention is to provide an externally pressurized fluid bearing which will not lock up when the external supply pressure is increased above that required to support the radial load on the bearing.

Other objects of this invention will become apparent from the following description when taken in conjunction with the accompanying drawings in which:

FIG. 1 illustrates one embodiment of this invention in which the shaft is of uniform cross-section and the structure associated with the shaft has been so constructed and shaped as to provide the desired fluid passageways between the shaft and the structure associated therewith.

FIG. 2 is a section view of the fluid bearing of FIG. 1, looking at the end of the shaft when no fluid is flowing through the passageways between the shaft and the structure associated therewith.

FIG. 3 illustrates another embodiment of the teachings of this invention in which the desired fluid passageways have been effected by the construction and shape of the shaft.

FIG. 4 illustrates a fluid bearing similar to that shown in FIG. 1, in which the bearing is undercut near the step in the bearing.

FIG. 5 is a fluid bearing similar to that showing in FIG. 1 and in which suitable dimensions are shown for an air bearing.

Figure 6:
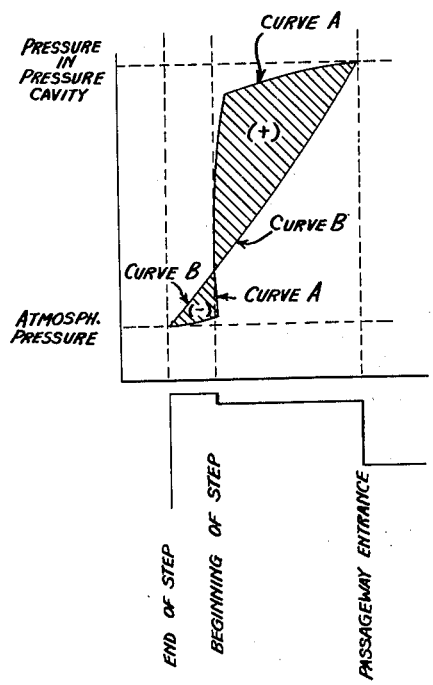
FIG. 6 is a graph showing the pressure drop of the air passing over the bearing surface shown in FIG. 1 when the shaft is loaded so that the shaft is touching the step portion of the bearing surface.

Referring to FIG. 1, there is illustrated a housing 1 of circular cross-section, which supports two identical bearings 2 and 3, which in turn are disposed to receive a shaft 4. The two bearings 2 and 3 are press fitted within the bore of the housing 1 so that fluid cannot pass between the bearings 2 and 3 and the housing 1. The bearings 2 and 3 are right circular cylinders, and each of the bearings 2 and 3 is bored to two diameters 5 and 6, and 7 and 8 to thereby effect two steps 9 and 10 and thus two stepped bearing surfaces 11 and 12, the function of which will be described hereinafter. In practice, the shaft 4 has a slightly smaller diameter than the bore diameters 5, 6, 7 and 8 of the bearings 2 and 3, to thus permit the shaft 4 to freely rotate and move in an axial direction. The bearings 2 and 3 are disposed on either end of the hollow portion of the housing 1, so that the bearings 2 and 3 partially fill the hollow portion of the housing 1 on either end, and form a pressure cavity 13, which is bound circumferentially by the housing 1 and bound on either side by the bearings 2 and 3. Extending through and beyond the bearings 2 and 3 and through the pressure cavity 13, is the shaft 4. Although the shape of the pressure cavity 13 is shown to be a right circular cylinder, the shape or dimensions of this cavity 13 are not critical. However, the distance from the housing 1 to the shaft 4 should be considerably greater than the distance from the bearing surfaces 11 and 12 to the shaft 4. There is a pressure port 14 which extends through the housing 1 and opens into the pressure cavity 13. The pressure port 14 is of sufficient cross-section and the pressure cavity 13 is of sufficient size so that there is very little pressure drop as a fluid passes through the pressure port 14 and through the pressure cavity 13.

For most of the structure of FIG. 1 so far described, the shape or dimensions are not critical. However, if the shaft 4, which, broadly speaking, is merely a member movable relative to the bearing surfaces 11 and 12, is to be rotated in the housing 1, it would be necessary that the shaft 4 be symmetrical about a longitudinal axis. But it would not be necessary, by any means, to be a right circular cylinder as shown. If the shaft 4 is to move axially, it would be necessary to have only a uniform cross-section. Therefore, the shaft 4 could be an infinite variety of shapes, and be within the scope of this invention. But the bearings 2 and 3 must be shaped so that the bearing surfaces 11 and 12 are in a closely spaced relationship to the shaft 4, and so that the contour of the bearing surfaces 11 and 12 follow closely the contour of the shaft 4. In FIG. 1, the bearing surfaces 11 and 12 are of circular configuration so that the bearing surfaces 11 and 12 follow closely the surface of the shaft 4, thereby forming stepped fluid passageways 15 and 16 between the shaft 4 and the bearing surfaces 11 and 12.

As illustrated, the steps 9 and 10 occur near the outer parts of the bearing surfaces 11 and 12, which parts are furthest away from the pressure cavity 13, so that as the fluid flows from the cavity 13 and through the passageways 15 and 16, the fluid will pass over the steps 9 and 10 at the end of its journey through the passageways 15 and 16. Thus, the fluid passes over a portion of the bearing surfaces 11 and 12 before it reaches steps 9 and 10. The steps 9 and 10 refer to those portions of the bearing surfaces 11 and 12 which are parallel to and raised above the other portion of the bearing surfaces 11 and 12, which steps 9 and 10 are raised portions of the bearing surfaces 11 and 12 which restrict passageways 15 and 16.

In practice, suitable operation can be obtained if the steps 9 and 10 comprise about one-sixth of the bearing surfaces 11 and 12, and with the shaft 4 centered the distances between the shaft 4 and the bearing surfaces 11 and 12 at the bores 5 and 7 are approximately twice as great as the distance between the shaft 4 and the bearing surfaces 11 and 12 at the bores 6 and 8. Thus, with the shaft 4 centered, the thicknesses of the passageways 15 and 16 adjacent to steps 9 and 10 are one-half the thickness of the remaining portions of the passageways 15 and 16. When air is used as a fluid, it has been suitable that the passageways 15 and 16 be about 0.0005 inch thick around the entire shaft, except that under the steps 9 and 10, the passageways 15 and 16 should narrow to about 0.00025 inch. Also (referring to FIG. 5), the length L of the passageways 15 and 16, measuring along the axis of the shaft 4, should each be one-half the diameter D of the shaft 4.

The particular dimensions disclosed herein are appropriate for air as a fluid. But because of the nature of the operation of this air bearing, any fluid could be used, whether liquid or gas, and still not depart from the spirit of this invention, even though somewhat different dimensions might be used, depending on the nature of the fluid used and the initial size of the fluid passageways 15 and 16. The $L/D$ ratio might be increased if the passageways 15 and 16 are widened.

Although the above mentioned dimensions and ratios are suitable for a bearing constructed in accordance with this invention, the following are the ranges of such dimensions and ratios for a bearing constructed in accordance with this invention:

(1) The width $W_s$ of the step (such as 9 or 10) varies from 1/30 to 1/2 of the width L of the bearing surface (such as 11 or 12).

(2) The clearance $C_s$ in the passageways (such as 15, 16, 30 and 32) at the steps (such as 9, 10, 22 and 23) varies from 0.3 to 0.9 of the clearance $C_r$ in the remaining portion of the passageways (such as 15, 16, 30 and 32).

(3) The length L of the passageways (such as 15, 16, 30 and 32) measuring along the axis of the shaft (such as 4 and 24) varies from 0.20 to 2.0 of the diameter D of the shaft (such as 4 and 24).

(4) The clearance $C_s$ in the passageways (such as 15, 16, 30 and 32) at the steps (such as 9, 10, 22 and 23) varies from 0.0001 inch to 0.0020 inch.

(5) The clearance $C_r$ in the passageways (such as 15, 16, 30 and 32) preceding the steps (such as 9, 10, 22 and 23) varies from 0.0002 inch to 0.0025 inch.

To explain the operation of the fluid bearing, referring to FIG. 1, only half of the fluid bearing will first be considered. Fluid is impelled under pressure through the pressure port 14 into the pressure cavity 13, where the fluid will then be forced out through the passageway 15 and past the step 9. Before the fluid is impelled into the pressure cavity 13, the shaft 4 is resting on the step 9. As seen in FIG. 2, the contact of the step 9 with the shaft 4 along the lower side of the shaft 4 will substantially block off the fluid flow along the underside of the shaft 4. But there will be considerable fluid flow over the top of the shaft 4, because of the larger opening between the step 9 and the shaft 4 on the upper side of the shaft 4. The fluid leaves the pressure cavity 13 and enters the passageway 15 at substantially the same pressure around the entire perimeter of the entrance to passageway 15 which entrance is adjacent to the pressure cavity 13. There is a reduction of pressure along the upper side of the shaft 4 for two reasons. First, because of the well-known physical principle that when the flow of a fluid is increased in velocity, the static pressure along the sides of the passageway through which the fluid flows decreases. Second, when a fluid flows, there is a force of friction which resists the flow of fluid as it proceeds through the passageway 15 which force of friction increases with an increase in the velocity of the fluid. Because of this force of friction, the static pressure drops as the fluid proceeds in its flow through the passageway 15. However, on the lower side of the shaft, the passageway 15 is substantially blocked off. Therefore, the fluid proceeds through the passageway 15 along the lower side of the shaft 4 at a very low velocity. As the fluid proceeds along the passageway 15, there is little drop in static pressure in the passageway 15 along the bottom of the shaft 4 for two reasons. First, considering the physical principle that when the flow of a fluid is increased in velocity, the static pressure along the sides of the passageway through which the fluid flow decreases; since there is so little flow of fluid along the bottom of the shaft 4 this physical phenomenon causes only a small reduction in fluid pressure along the bottom of the shaft 4. Second, the velocity of flow is so small that little friction is created as the fluid flows along the bottom side of the passageway 15. Because of this lack of frictional force, there is little drop in pressure as the fluid proceeds through the passageway 15 along the lower portion of the shaft 4. Therefore, along the bottom of passageway 15, there is little pressure drop from the pressure cavity 13 to the point in passageway 15 where the step 9 begins. This causes a build-up of pressure along the lower side of the shaft 4, and there is an unbalance of forces tending to push the shaft 4 off the step 9. This unbalance of forces tends to center the shaft 4 in the bearing surface 11. When a load is imposed on the shaft 4 which acts perpendicular to the axis of the shaft 4, the shaft 4 gets closer to the step 9 and tends to cut down the flow of fluid in the passageway 15 near where the step 9 is closest to the shaft 4. Therefore, there will be a build-up of pressure in the passageway 15 where the flow of fluid is substantially impeded by the step 9, which is the case when the shaft 4 comes close to the step 9. Where there is this build-up of pressure, there will be the unbalance of forces tending to force the shaft 4 away from the step 9. In this manner, the shaft 4 is continually centered in the bearing surface 11. Bearing 3 acts in substantially the same manner on shaft 4.

The graph of FIG. 6 illustrates the pressure drop of air flowing through the passageway 15 when air is impelled under pressure through pressure port 14, and when the shaft 4 is so loaded as to bear against the bottom portion of step 9. Curve A shows the pressure drop of the flow of air in passageway 15 along the bottom of bearing surface 11 where the shaft 4 bears against the step 9. Curve B shows the pressure drop of air through the passageway 15 along the top of shaft 4 and along the top of bearing surface 11, where the step 9 is furthest from the shaft 4. As curve A shows, there is little pressure drop before the air reaches the step 9, where the pressure drops rather abruptly almost to atmospheric pressure. However, as curve B shows, there is an almost uniform drop of pressure through passageway 15, where the step 9 is furthest away from the shaft 4. The upper area shaded by diagonal lines (marked "+") represents the force on the shaft 4 which tends to center the shaft 4 in the bearing surface 11. The lower shaded area (marked "−") is a force acting in the vicinity of the step 9 which tends to keep the shaft 4 against the step 9. The resultant force, which would be represented by the difference in the upper shaded area and the lower shaded area, would tend to keep the shaft centered.

Figure 7:
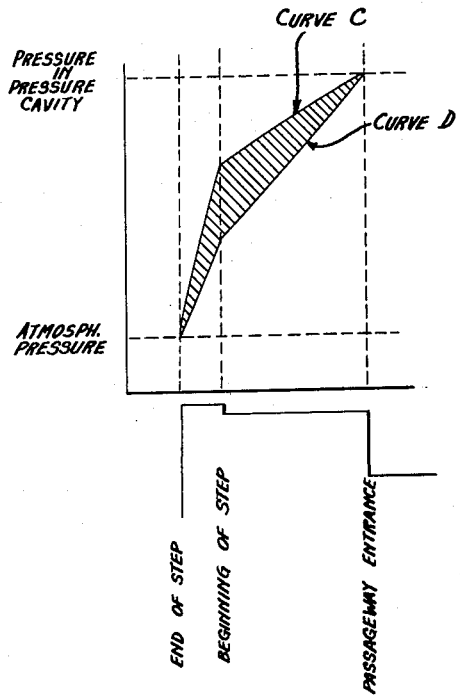
FIG. 7 is a graph showing the pressure drop of the air passing over the bearing surface shown in FIG. 1 when the shaft is floating so that it is lifted off the step portion of the bearing surface.

The graph of FIG. 7 illustrates the pressure drop of air flowing through the passageway 15 when air is impelled under pressure through the pressure port 14, and when the shaft 4 is floating and has lifted off the bottom portion of step 9. Curve C shows the pressure drop of the flow of air in passageway 15 along the bottom of bearing surface 11. Curve D shows the pressure drop of air through the passageway 15 along the top of shaft 4 and along the top of bearing surface 11. The shaded area shown in the graph of FIG. 7 represents the static fluid pressure force on the shaft 4 which supports the shaft load.

Referring to FIG. 3, there is illustrated another embodiment of this invention in which like components of FIGS. 1 and 3 have been given the same reference characters. The main distinction between the apparatus of FIGS. 1 and 3 is that in the apparatus of FIG. 3, steps 22 and 23 of circular cross-section are provided on a shaft 24 instead of on the bearings 2 and 3 as shown in FIG. 1. Identical bearings 26 and 28 of uniform circular cross-section, are disposed at opposite ends of the housing 1, the bearings 26 and 28 being press-fitted into the bore of the housing 1 so as to prevent the passage of fluid between the housing 1 and the bearings 26 and 28. Thus, stepped passageways 30 and 32 are provided between the shaft 24 and the respective bearings 26 and 28. These passageways 30 and 32 function in substantially the same manner as do the passageways 15 and 16 of FIG. 1. Therefore, a further description of the operation of the apparatus of FIG. 3 is not included.

FIG. 4 shows another embodiment of this invention in which like components of FIGS. 1 and 4 have been given the same reference characters. A bearing 44 similar to the bearing 2 of FIG. 1 is provided with an undercut 46 of circular configuration which entirely encircles a portion of the bearing surface 11 in order to render the step 9 movable in a radial direction in response to fluid flow through the passageway 15, and thereby minimize vibrations of the fluid bearing.

The apparatus embodying the teachings of my invention has several advantages. First, with reference to FIG. 1, when a shock load is applied to the shaft 4, this load might be large enough to cause the shaft 4 to break through the cushion of fluid and touch for instance the bearing surface 11. Because of the step 9 in the passageway 15 the shaft 4 will contact the bearing surface 11 only at the step 9. Therefore, scoring will be localized to a small portion of the bearing surface 11 and the shaft 4. Furthermore, the tendency of the shaft 4 to contact the step portion of the bearing surface 11 will be decreased because of an increase in the static fluid pressure acting over a major portion of the bearing surface 11 when the shaft 4 tends to contact the bearing surface 11. This is also true of the apparatus of FIG. 3 in which the steps 22 and 23 are disposed on the shaft 24. Further, there will be much less tendency for the shaft to "seize" when the shaft contacts the bearing along a much smaller area.

Another advantage of apparatus constructed in accordance with the teachings of this invention is that the externally pressurized fluid bearing has a high radial load handling capacity while a relatively low external supply pressure is maintained on the bearing and while a relatively low quantity of fluid flows per unit of time through the bearing.

A further advantage of a fluid bearing constructed in accordance with the teachings of this invention is that it can properly operate when exposed to cryogenic temperatures or temperatures approaching the melting point of the bearing material.

Additional advantages of a fluid bearing constructed in accordance with the teachings of this invention are that the associated shaft will accurately position itself and the bearing will not lock up when the external supply pressure is increased above that required to support the radial load on the bearing.

In air bearings, there has been much difficulty in eliminating vibrations when operating at very high speeds. This problem has been discussed quite ably in two patents issued to R. M. Wilcox, 2,683,635 and 2,683,636, and various solutions have been found by Wilcox which specify certain relationships in the dimensions of the orifice, the volume of pressure pockets, the bearing surface, and the cross-sectional area through which the air must pass. In an air bearing constructed in accordance with the teachings of this invention, this problem of vibration has been largely eliminated. Speeds of over 80,000 r.p.m. have been obtained on a 0.625″ diameter shaft, and speeds of 24,000 r.p.m. on a 3.00″ diameter shaft. The difficulties discussed by Wilcox were overcome by the construction of this air bearing.

In accordance with this invention when the shaft is rotated at high speeds within the bearing, it is possible to shut off the air supply and allow the shaft to rotate on a hydrodynamic film of air. This was found to occur with a 3.00″ shaft at 5,000 r.p.m. When the shaft is rotating, it carries with it a small film of air. The bearing likewise has a small film of air which remains stationary along the surface of the bearing. At high speeds the effect of these two films passing by each other is that of an air bearing. A cushion of air is formed between the bearing and the shaft, keeping the bearing and the housing out of contact. Of course, this hydrodynamic film is effective only when small forces are applied laterally to the shaft. If a very large load is applied laterally to the shaft, the surfaces of the bearing and shaft will come into contact. To obtain the effect of this hydrodynamic film, the dimensions of the space between the bearing and the shaft will vary with the type of fluid used, and the relative velocity of the two surfaces. With this air bearing, a space of 0.005″ as shown in FIG. 5 was found to be satisfactory for the 3.00″ shaft to rotate at 5,000 r.p.m. The space under the step on the shaft was about half of 0.0005″ or 0.00025″.

To summarize briefly the spirit of this invention, fluid is fed to the bearing surface at a fairly uniform pressure about the perimeter of the entrance to the passageway between the shaft and the bearing surface. The supply line and the annular gas chamber are of sufficient size so that even though there may be variations in the air flow over various parts of the bearing surface because of some lateral movement of the shaft, there is still a fairly uniform pressure feeding the air to the bearing surface. This is contrary to the prior art on multiple orifice bearings. The prior art on multiple orifice bearings valves the air before the air reaches the bearing surface, either by actual valves in the supply lines, or by using orifices so that variations in flow cause variations in pressure of the air leaving the orifice. This invention, on the other hand, uses a step on the bearing surface or on the shaft and this acts as a valve or impedance on the fluid flowing over the bearing surface, but the valving or impeding effect is produced while the fluid is passing over the bearing surface. The greatest impedance occurs when the fluid passes over the step portion of the bearing surface. This results in an easily manufactured and efficient fluid bearing. The fluid passes over a portion of the bearing surface with relatively less impedance and then passes over a portion of the bearing surface with relatively greater impedance. As the shaft nears the bearing surface, the impedance of the portion of the bearing surface with relatively greater impedance increases at a greater ratio than the impedance of the portion of the bearing surface with relatively less impedance.

Since numerous changes may be made in the above apparatus and different embodiments may be made without departing from the spirit and scope thereof, it is intended that all matter container in the foregoing description or shown in the accompanying drawings shall be interpreted as illustrative and not in a limiting sense.

I claim as my invention:

1. A pressurized fluid bearing for supporting radial loads comprising a cylindrical shaft, a cylindrical bearing having a surface disposed around said shaft to define a fluid passageway having an entrance, a first portion of said fluid passageway adjacent said entrance having a substantially constant thickness between 0.0002 inch and 0.0025 inch, a second portion of said passageway having a substantially constant thickness between 0.0001 inch and 0.002 inch, and means for supplying fluid to said passageway so that said fluid enters the first portion of said passageway under a substantially constant pressure around the entire perimeter of said entrance, whereby the fluid flows through the passageway to cause fluid pressure differentials in the first and second portions to provide a separating force between the shaft and the bearing.

2. A pressurized fluid bearing structure for supporting radial loads comprising a cylindrical shaft, a pair of cylindrical bearings having surfaces disposed around said shaft to define a pair of fluid passageways having entrances, each of said passageways having a first portion adjacent the entrance with a substantially constant thickness between 0.0002 inch and 0.0025 inch and a second portion with a substantially constant thickness between 0.0001 inch and 0.002 inch, and means for supplying fluid to each of said passageways so that said fluid enters the first portion of said passageway under a substantially constant pressure around the entire perimeter of the entrance, whereby the fluid flows through the passageways to cause fluid pressure differentials in the first and second portions to provide a separating force between the shaft and the bearings.

3. The combination according to claim 2 wherein said pair of bearings are laterally spaced along said shaft and said means for supplying fluid under pressure includes a housing defining a cavity for receiving the fluid under pressure, said cavity being of sufficient size to prevent any substantial pressure drop in the cavity as fluid passes from the cavity into the passageways.

4. A pressurized fluid bearing for supporting radial loads comprising a cylindrical shaft, a pair of radially extending steps circumferentially disposed around said shaft, a pair of cylindrical bearings spaced along said shaft, each of said bearings having a surface disposed around one of said steps to define a fluid passageway having an entrance, a first portion of each of said fluid passageways adjacent said entrance having a substantially constant radial thickness between 0.0002 inch and 0.0025 inch, a second portion of each of said fluid passageways having a substantially constant radial thickness between 0.0001 inch and 0.002 inch, and means for supplying fluid to each of said passageways so that said fluid enters the first portion of said passageway under a substantially constant pressure around the entire perimeter of said entrance, whereby the fluid flows through the passageways to cause fluid pressure differentials in the first and second portions and provide a separating force between the shaft and the bearings.

5. The combination according to claim 4 wherein said means for supplying fluid under pressure includes a housing defining a cavity for receiving the fluid under pressure, said cavity being of sufficient size to prevent any substantial pressure drop in the cavity as fluid passes from the cavity into the passageways.

References Cited in the file of this patent

UNITED STATES PATENTS

| 2,929,548 | Crooks et al. | Mar. 22, 1960 |

FOREIGN PATENTS

| 645,881 | Great Britain | Nov. 8, 1950 |
| 555,945 | Belgium | Oct. 15, 1957 |
| 215,570 | Australia | June 10, 1958 |